United States Patent
Liang et al.

(10) Patent No.: US 10,771,300 B2
(45) Date of Patent: Sep. 8, 2020

(54) INFORMATION SENDING METHOD AND APPARATUS, AND COMPUTER STORAGE MEDIUM

(71) Applicant: ZTE CORPORATION, Shenzhen (CN)

(72) Inventors: Chunli Liang, Shenzhen (CN); Shuqiang Xia, Shenzhen (CN); Xianghui Han, Shenzhen (CN); Wen Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 4 days.

(21) Appl. No.: 16/087,274

(22) PCT Filed: Mar. 7, 2017

(86) PCT No.: PCT/CN2017/075850
§ 371 (c)(1),
(2) Date: Sep. 21, 2018

(87) PCT Pub. No.: WO2017/162021
PCT Pub. Date: Sep. 28, 2017

(65) Prior Publication Data
US 2020/0007368 A1    Jan. 2, 2020

(30) Foreign Application Priority Data

Mar. 25, 2016  (CN) .......................... 2016 1 0178059

(51) Int. Cl.
*H04L 27/26*    (2006.01)
*H04W 72/04*   (2009.01)
*H04W 72/12*   (2009.01)

(52) U.S. Cl.
CPC ...... *H04L 27/2613* (2013.01); *H04L 27/2636* (2013.01); *H04W 72/0453* (2013.01); *H04W 72/1221* (2013.01)

(58) Field of Classification Search
CPC ........... H04L 27/2613; H04L 27/2636; H04W 72/0453; H04W 72/1221
See application file for complete search history.

(56) References Cited

U.S. PATENT DOCUMENTS 8,897,164 B2    11/2014  Yu
9,391,759 B2    7/2016   Zhu et al.
(Continued)

FOREIGN PATENT DOCUMENTS

CN    102118782 A    7/2011
CN    102170702 A    8/2011
(Continued)

OTHER PUBLICATIONS

LG Electronics: "Discussion on PUCCH design for Latency reduction", Feb. 2016; 3GPP TSG RAN WG1 Meeting #84; R1-160654, 3rd Generation Partnership Project (3GPP), Mobile Competence Centre; 650 Route Des Lucioles; F-06921; St Julian's, Malta; 7 pgs.
(Continued)

*Primary Examiner* — Kenneth T Lam
(74) *Attorney, Agent, or Firm* — Li & Cai Intellectual Property (USA) Office

(57) ABSTRACT

Provided are an information sending method and apparatus, and a computer storage medium. The method includes: according to information to be sent on a physical uplink channel, determining, from N predefined sequences, a sequence corresponding to a reference signal to be sent, wherein the N predefined sequences have the same non-zero value on a predetermined position, N being an integer greater than or equal to 2; and mapping the determined
(Continued)

---

Determine, according to information to be sent on a physical uplink channel, a sequence corresponding to a reference signal to be sent from N predefined sequences, where the N predefined sequences have a same non-zero value on a predetermined position, and N is an integer greater than or equal to 2 — S302

Map the determined sequence corresponding to the reference signal and the information to a time-frequency resource, and send the reference signal and the information on the time-frequency resource — S304 sequence corresponding to the reference signal and the information to a time-frequency resource, and sending the reference signal and the information on the time-frequency resource.

19 Claims, 5 Drawing Sheets

(56) References Cited

U.S. PATENT DOCUMENTS

| | | | |
|---|---|---|---|
| 2008/0225788 A1* | 9/2008 | Inoue | H04L 1/0006 370/329 |
| 2010/0091755 A1* | 4/2010 | Kwon | H04L 5/0007 370/344 |
| 2011/0038387 A1* | 2/2011 | Han | H04L 5/0053 370/480 |
| 2011/0051680 A1* | 3/2011 | Kwak | H04L 1/1854 370/329 |
| 2012/0327886 A1* | 12/2012 | Yu | H04W 72/042 370/329 |
| 2015/0049649 A1 | 2/2015 | Zhu et al. | |
| 2016/0270109 A1* | 9/2016 | Jiang | H04L 5/0005 |
| 2016/0286423 A1 | 9/2016 | Zhu et al. | |
| 2017/0041103 A1* | 2/2017 | Maattanen | H04L 1/1671 |
| 2017/0094686 A1* | 3/2017 | Ramamurthi | H04W 72/0406 |
| 2018/0098337 A1* | 4/2018 | Lee | H04W 72/042 |
| 2018/0206230 A1* | 7/2018 | Cheng | H04J 13/0059 |
| 2019/0068423 A1* | 2/2019 | Hwang | H04L 5/00 |

FOREIGN PATENT DOCUMENTS

| | | |
|---|---|---|
| CN | 102195703 A | 9/2011 |
| CN | 102437986 A | 5/2012 |
| CN | 103427940 A | 12/2013 |
| WO | 2011019795 A1 | 2/2011 |

OTHER PUBLICATIONS

Nokia Siemens Networks et al: "Multiplexing of ACK/NACK and CQI from the same UE", May, 2007; 3GPP TSG RAN WG1 Meeting #49; R1-072311, 3rd Generation Partnership Project (3GPP); Mobile Competence Centre, 650, Route Des Lucioles; 4 pgs.

Motorola Mobility et al: "Further discussion on short duration uplink control channel", Feb. 2017; 3GPP TSG RAN WG1 Meeting #88; R1-1703046; 3rd Generation Partnership Project (3GGP), Mobile Competence Centre, Athens, Greece; 4 pgs.

International Search Report in the international application No. PCT/CN2017/075850, dated May 23, 2017, 2 pgs.

English Translation of the Written Opinion of the International Search Authority in the international application No. PCT/CN2017/075850, dated May 23, 2017, 6 pgs.

Supplementary European Search Report in the European application No. 17769298.5, dated Mar. 6, 2019, 9 pgs.

\* cited by examiner

INFORMATION SENDING METHOD AND APPARATUS, AND COMPUTER STORAGE MEDIUM

TECHNICAL FIELD

The disclosure relates to the field of communications, and in particular, to a method and device for sending information, and a computer storage medium.

BACKGROUND

The rapid development of the mobile Internet and the Internet of Things has led to explosive growth of data traffic and extensive rise of diversified and differentiated services. The fifth-generation mobile communication technology (5-generation, 5G), as a new-generation mobile communication technology, supports a higher rate, a huge number of links, an ultra-low delay, higher reliability, hundredfold increase of energy efficiency and the like with respect to the fourth-generation mobile communication technology (4-generation, 4G), so as to support new requirement changes. The ultra-low delay, as a key index of the 5G technology, directly affects the development of delay-limited services such as the Internet of Vehicles, industrial automation, remote control, and smart grids. A series of current standard researches on 5G delay reduction are gradually being advanced.

Transmission time interval (TTI) reduction, as the current important research direction of delay reduction, aims to reduce the length of a current TTI which is 1 ms long to 0.5 ms or even 1 to 2 symbols, thereby reducing minimum scheduling time exponentially. Thus, a single transmission delay can also be reduced exponentially without changing a frame structure.

In an existing long term evolution (LTE) uplink transmission system, a reference signal (RS) for data demodulation and data are multiplexed in a time-division manner. That is, the reference signal and the data occupy different time-domain symbols. This is the same for a physical uplink control channel (PUCCH) and a physical uplink shared channel (PUSCH) of the current LTE. However, as the length of the TTI decreases, many problems occur. For example, when the length of the TTI is reduced to 1 to 7 symbols, the transmission structures of the existing PUCCH and PUSCH cannot be used directly; shortening of the TTI in time domain will affect the demodulation performance of transmitted information; and a decrease in the number of symbols within the TTI will result in a decrease in available resources for transmitting valid data due to excessive overheads of a reference signal (RS).

For the problem in the related art of a decrease in available resources of a physical uplink channel for sending valid data due to that the overheads of the reference signal increase as the number of symbols of the TTI decreases, no effective solution has been proposed yet.

SUMMARY

To solve the above technical problem, the disclosure provides a method and device for sending information, and a computer storage medium.

According to an aspect of the disclosure, a method for sending information is provided, the method includes that: a sequence corresponding to a reference signal to be sent is determined from N predefined sequences according to information to be sent on a physical uplink channel, where the N predefined sequences have a same non-zero value on a predetermined position, and N is an integer greater than or equal to 2; the determined sequence corresponding to the reference signal and the information are mapped to a time-frequency resource, and the reference signal and the information are sent on the time-frequency resource.

In an implementation of the disclosure, the N predefined sequences have the same non-zero value on the predetermined position includes:

when the N predefined sequences are generated in a frequency domain, the N predefined sequences have the same non-zero value on the predetermined position;

when the N predefined sequences are generated in a time domain, sequences obtained by performing discrete fourier transform on the N predefined sequences have the same non-zero value on the predetermined position.

In an implementation of the disclosure, the operation of determining, according to the information to be sent on the physical uplink channel, the sequence corresponding to the reference signal to be sent from the N predefined sequences may include that:

the sequence corresponding to the reference signal to be sent is selected from the N predefined sequences according to a bit value of the information.

In an implementation of the disclosure, properties of the N predefined sequences include one of: having a property of constant amplitude in a frequency domain, having a property of constant amplitude in a time domain, and having a property of constant amplitude in both the frequency domain and the time domain.

In an implementation of the disclosure, the time-frequency resource includes a time-domain resource and a frequency-domain resource; the frequency-domain resource includes K time-domain symbols, where $1 \leq K \leq 7$ and K is a positive integer; the frequency-domain resource includes P subcarriers, where P is a positive integral multiple of one of the following numbers: 2, 3, 4, 6, or 12.

In an implementation of the disclosure, the frequency-domain resources corresponding to the K time-domain symbols are the same, or in the frequency-domain resources, frequency-domain resources corresponding to the K time-domain symbols are located on different subcarriers using a frequency hopping structure.

In an implementation of the disclosure, the operation of sending the reference signal and the information on the time-frequency resource may include that:

when the sequence corresponding to the reference signal has a property of constant amplitude on the frequency-domain resource, the sequence corresponding to the reference signal is mapped to the P subcarriers, an inverse discrete fourier transform is performed on the sequence corresponding to the reference signal, and the reference signal and the information are sent;

when the sequence corresponding to the reference signal has a property of constant amplitude on the time-domain resource, a discrete fourier transform of P points is performed on the sequence corresponding to the reference signal, the transformed sequence is mapped to the P subcarriers or a subset of the P subcarriers, an inverse discrete Fourier transform is performed on the mapped sequence and the reference signal and the information are sent.

In an implementation of the disclosure, the operation of sending the reference signal on the time-frequency resource may include that:

the reference signal is sent on at least one of the K time-domain symbols.

In an implementation of the disclosure, when the reference signal is sent on more than one of the K time-domain symbols, different reference signals are sent on different time-domain symbols.

In an implementation of the disclosure, when the time-frequency resource includes two time-domain symbols, the operation of sending the reference signal and the information on the time-frequency resource may include that:

the reference signal is sent on a first time-domain symbol, and the information is sent on a second time-domain symbol; or, the information is sent on the first time-domain symbol, and the reference signal is sent on the second time-domain symbol; or, the reference signal is sent on both of the two time-domain symbols, where the reference signal carries the information.

In an implementation of the disclosure, when the reference signal is sent on the two time-domain symbols, frequency-domain subcarriers occupied by the two time-domain symbols are different.

In an implementation of the disclosure, the information includes at least one of uplink control information or uplink service information.

In an implementation of the disclosure, the predetermined position includes: one symbol in the sequence, or multiple symbols equally spaced in the sequence.

In an implementation of the disclosure, when the N predefined sequences include sequences obtained by performing different time-domain cyclic shifts on a same sequence, or sequences obtained by performing different frequency-domain phase rotations on a same sequence, and the N predefined sequences includes the following characteristic:

the N predefined sequences have a same element among the N predefined sequences at each of X positions in a frequency domain, where X is a number of elements in a set of values of n that satisfy an equation $$\frac{\alpha \times n}{L} = y,$$

α is a relative cyclic shift amount or phase rotation amount between any two of the N predefined sequences, y is an integer greater than or equal to 0, n is an integer taken from a set [0, L−1], L is the length of the predefined sequences, 0<α<L, and N is a positive integer greater than or equal to 2 and less than L.

According to another aspect of the disclosure, a device for sending information is also provided, the device includes that:

a determining module configured to determine, according to information to be sent on a physical uplink channel, a sequence corresponding to a reference signal to be sent from N predefined sequences, where the N predefined sequences have a same non-zero value on a predetermined position, and N is an integer greater than or equal to 2; a mapping module configured to map the sequence corresponding to the reference signal and the information to a time-frequency resource; and a sending module configured to send the reference signal and the information on the time-frequency resource.

In an implementation of the disclosure, the determining module includes:

an obtaining unit configured to obtain a number of bits of the information and a type of the information; and a selecting unit configured to select, according to the number of bits of the information and the type of the information, the sequence corresponding to the reference signal to be sent from the N predefined sequences.

According to another aspect of the disclosure, a computer storage medium is further provided, in which computer executable programs are stored, where the computer programs are configured to execute the method for sending information.

By means of the technical solutions in embodiments of the disclosure, a sequence corresponding to a reference signal is selected from N sequences according to information to be sent on a physical uplink channel, so that the technical solution of sending the information according to the sequence of the reference signal is implemented, and the problem in the related art of a decrease in available resources of a physical uplink channel for sending valid data (equivalent to the information to be sent on the physical uplink channel) due to that the overheads of the reference signal increase as the number of symbols of the TTI decreases is solved, and thus, available resources for transmitting the valid data are increased.

BRIEF DESCRIPTION OF DRAWINGS

The accompanying drawings described herein are intended to provide a further understanding of the disclosure, and constitute a part of the application. The exemplary embodiments of the disclosure and descriptions thereof are intended to explain the disclosure, and do not mean to improperly limit the disclosure. In the accompanying drawings.

DETAILED DESCRIPTION

The disclosure is described in detail below with reference to the accompanying drawings and in conjunction with embodiments. It should be noted that the embodiments in the application and features in the embodiments may be combined with each other in a non-conflicting situation.

Other features and advantages of the disclosure will be described in the following description, and some of these will become apparent from the description or be understood by implementing the disclosure. The objectives and other advantages of the disclosure can be implemented or obtained by structures specifically indicated in the description, claims, and accompanying drawings.

To make those skilled in the art better understand the disclosure, the technical solutions in the embodiments of the disclosure will be described clearly and completely below with reference to the accompanying drawings in the embodiments of the disclosure. It is apparent that the described embodiments are merely some rather than all of the embodiments of the disclosure. All other embodiments obtained by persons of ordinary skill in the art based on the embodiments of the disclosure without creative efforts shall fall within the scope of protection of the disclosure.

Figure 1:
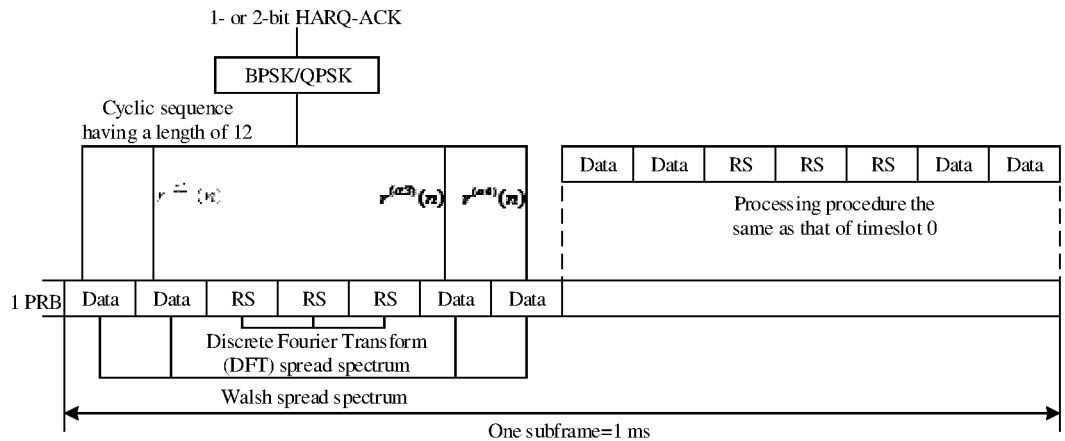
FIG. 1 is a schematic structural diagram of a PUCCH format 1a/1b under a normal cyclic prefix (CP) when TTI=1 ms.

FIG. 1 is a schematic structural diagram of a PUCCH Format 1a/1b under a normal cyclic prefix (CP) when TTI=1 ms. FIG. 1 illustrates a transmission structure for acknowledgment (ACK)/negative acknowledgment (NACK) response information of the PUCCH Format 1a/1b under the normal CP when the TTI=1 ms. The existing PUCCH occupies one subframe (corresponding to two timeslots) in a time domain and one physical resource block (PRB) in a frequency domain, frequency hopping is used between the timeslots, and the PUCCH Format 1a/1b is configured for sending ACK/NACK response information of a PDSCH. In the structural diagram illustrated in FIG. 1, a reference signal (RS) is sent on time-domain symbols #2, #3 and #4 of each timeslot, and control information is sent on symbols #0, #1, #5 and #6 of each timeslot, where the time-domain symbols are numbered starting from 0. From FIG. 1, it can be seen that the reference signal and the control information are multiplexed in a time-division manner. In addition, the existing structure uses a time-domain spreading approach to increase the number of multiplexing users. However, when a short TTI technology is used to implement delay reduction, the number of symbols of the TTI is only 1 to 7. Existing timeslot-based frequency hopping structures and time-domain spreading structures cannot be applied, especially when the number of the symbols of the TTI is only 1 or 2.

Figure 2:
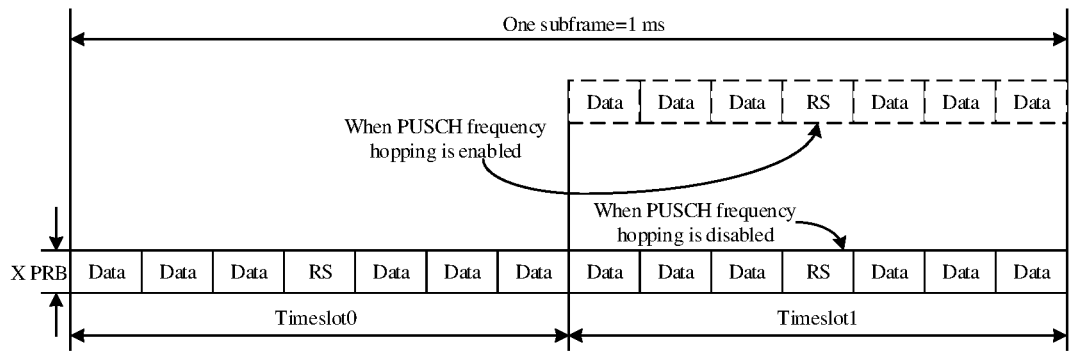
FIG. 2 is a schematic structural diagram of a PUSCH under a normal CP when TTI=1 ms.

FIG. 2 is a schematic structural diagram of a PUSCH under a normal CP when TTI=1 ms. As illustrated in FIG. 2, the PUSCH is configured for sending uplink service information. In an existing PUSCH structure, the reference signal occupies a time-domain symbol #3 of each timeslot, and service information occupies the remaining symbols of the timeslot, where the time-domain symbols are numbered starting from 0. In common with the PUCCH, on the PUSCH, the reference signal and the service information are also multiplexed in a time-division manner, and the reference signal and the service information respectively occupy different time-domain symbols. However, when a short TTI technology is used to implement delay reduction, the number of the symbols of the TTI is only 1 to 7, and the existing PUSCH structure cannot be applied, especially when the number of the symbols of the TTI is only 1 or 2.

Figure 3:
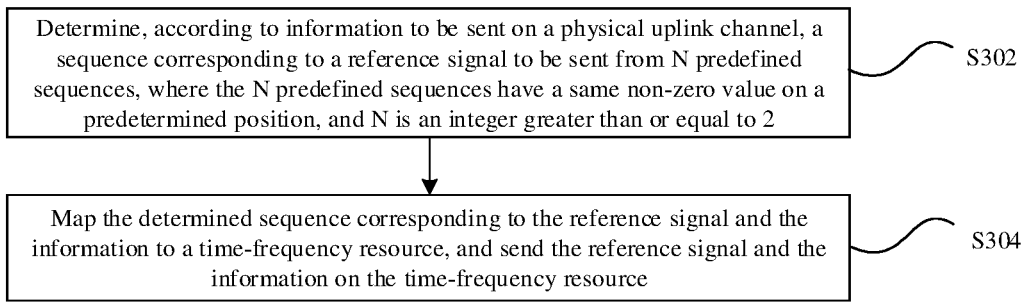
FIG. 3 is a flowchart of a method for sending information according to an embodiment of the disclosure.

To solve the above problems, the embodiments of the disclosure provide a method for sending information. FIG. 3 is a flowchart of a method for sending information according to an embodiment of the disclosure. As illustrated in FIG. 3, the method includes the following operations.

Operation S302: a sequence corresponding to a reference signal to be sent is determined from N predefined sequences according to information to be sent on a physical uplink channel, where the N predefined sequences have a same non-zero value on a predetermined position, and N is an integer greater than or equal to 2.

Operation S304: the sequence corresponding to the reference signal and the information are mapped to a time-frequency resource, and the reference signal and the information are sent on the time-frequency resource.

By means of the technical solutions according to embodiments of the disclosure, N sequences having a same non-zero value on a predetermined position are predefined, a sequence corresponding to a reference signal is selected from the N sequences according to information to be sent on a physical uplink channel, the sequence and the information are both mapped to a time-frequency resource, and the reference signal and the information are sent on the time-frequency resource. By using the above technical solution provided by the embodiments of the disclosure, the problem in the related art of a decrease in available resources of a physical uplink channel for sending valid data due to that the overheads of the reference signal increase as the number of symbols of the TTI decreases is solved, and thus, available resources for transmitting the valid data are increased.

In some embodiments, the N predefined sequences have a same non-zero value on a predetermined position may include that: the N predefined sequences have the same non-zero value on one symbol of the sequence; or the N predefined sequences have the same non-zero value on multiple symbols equally spaced of the sequence. Specifically, when the sequence corresponding to the reference signal is generated in a frequency domain, the N predefined sequences have the same value on the predetermined position; and when the sequence corresponding to the reference signal is generated in a time domain, sequences obtained by performing discrete fourier transform on the N predefined sequences have the same value on the predetermined position.

Operation S302 can be implemented in multiple implementations, and can be implemented, in the embodiments of the disclosure, through the following technical solution: the number of bits of the control information and the type of the control information are obtained; and the sequence corresponding to the reference signal to be sent is selected from the N predefined sequences according to a bit value of the information. An implementation in which operation S302 may be implemented may be specifically illustrated in a second embodiment below, and is not described here.

Because the N predefined sequences have the following properties, the properties of the sequence corresponding to the reference signal that is selected from the N predefined sequences include one of: having a property of constant amplitude in a frequency domain, having a property of constant amplitude in a time domain, or having a property constant amplitude in both the frequency domain and the time domain. When the sequence corresponding to the reference signal has a property of constant amplitude on a frequency-domain resource, mapping the sequence corresponding to the reference signal to P subcarriers, and sending the sequence after performing inverse discrete Fourier transform; and when the sequence corresponding to the reference signal has a property of constant amplitude on a time-domain resource, performing discrete Fourier transform of P points on the sequence corresponding to the reference signal, mapping the transformed sequence to the P subcarriers or a subset of the P subcarriers, and sending the sequence after performing inverse discrete Fourier transform. The P subcarriers are resources included in the frequency-domain resource. P preferably includes a positive integral multiple of one of the following numbers: 2, 3, 4, 6, or 12. The time-domain resource further includes K time-domain symbols, where $1 \leq K \leq 7$ and K is an integer. It should be noted that the "the property of constant amplitude" may be interpreted as a property that the amplitude is constant.

In some embodiments, the frequency-domain resources corresponding to the K time-domain symbols are the same, or in the frequency-domain resource, frequency-domain resources corresponding to the K time-domain symbols are located on different subcarriers using a frequency hopping structure.

In the technical solution embodied in operation S304, sending the reference signal and the control information on the time-frequency resource may be implemented through the following solution: the reference signal is sent on at least one symbol among the K time-domain symbols, and when the reference signal is sent on multiple time-domain symbols among the K time-domain symbols, different reference signals are sent on different time-domain symbols.

The improvement to the above technical solution in the embodiments of the disclosure is that: when the time-frequency resource includes two time-domain symbols, sending the reference signal and the information on the time-frequency resource may be implemented through the following solution. The reference signal is sent on a first time-domain symbol, and the information is sent on a second time-domain symbol. Or, the information is sent on the first time-domain symbol, and the reference signal is sent on the second time-domain symbol, Or, the reference signal is sent on both of the two time-domain symbols, where the reference signal carries the information. In the second embodiment, how to carry information in a reference signal has been introduced in detail, and is not described here. In an example, when the reference signal is sent on the two time-domain symbols, frequency-domain subcarrier positions occupied by the two time-domain symbols are different.

When the N predefined sequences are constituted by a sequence and sequences obtained by performing time-domain cyclic shifts or frequency-domain phase rotations on the sequence; and the N predefined sequences have, but are not limited to, the following characteristic.

If a minimum value of a relative cyclic shift amount or phase rotation amount between any two of the N predefined sequences is set to α, the N predefined sequences have a same element among the N predefined sequences at each of X positions in a frequency domain, where X is a number of elements in a set of values of n that satisfy an equation $$\frac{\alpha \times n}{L} = y;$$

y is an integer greater than or equal to 0; n=0, 1, 2, ..., L−1; L is the length of the sequence; 0<α<L; and 2≤N<L.

Figure 4:
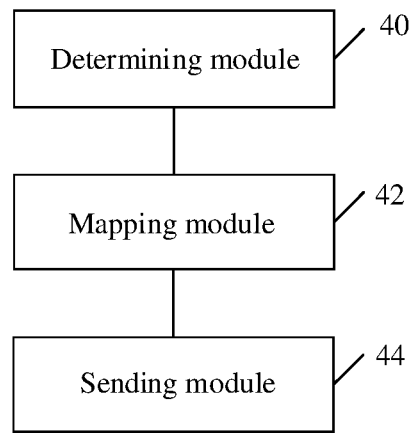
FIG. 4 is a structural block diagram of a device for sending information according to an embodiment of the disclosure.

The embodiments of the disclosure further provide a device for sending information, which is used for implementing the above embodiments and implementations. Those that have already been illustrated are not described again. Modules involved in the device are described below. As used below, the term "module" may implement the combination of software and/or hardware having predetermined functions. Although the device described in the following embodiments is preferably implemented by software, implementation by hardware or the combination of the software and the hardware is also possible and may be conceived. FIG. 4 is a structural block diagram of a device for sending information according to an embodiment of the disclosure. As illustrated in FIG. 4, the device includes a determining module 40, a mapping module 42 and a sending module 44.

The determining module 40 is configured to determine, according to information to be sent on a physical uplink channel, a sequence corresponding to a reference signal to be sent from N predefined sequences, where the N predefined sequences have a same non-zero value on a predetermined position, and N is an integer greater than or equal to 2.

The mapping module 42 is connected with the determining module 40 and configured to map the determined sequence corresponding to the reference signal and the information to a time-frequency resource.

The sending module 44 is connected with the mapping module 42 and configured to send the reference signal and the information on the time-frequency resource.

Under the combined action of the modules provided in the embodiments of the disclosure, N sequences having the same non-zero value on a predetermined position are predefined, a sequence corresponding to a reference signal is selected from the N sequences according to information transmitted on a physical uplink channel, the sequence and the information are both mapped to a time-frequency resource, and the reference signal and the information are sent on the time-frequency resource. By using the above technical solution provided by the embodiments of the disclosure, the problem in the related art of a decrease in available resources of a physical uplink channel for sending valid data (equivalent to information to be sent on a physical uplink channel) due to that the overheads of the reference signal increase as the number of symbols of the TTI decreases is solved, and thus, available resources for transmitting the valid data are increased.

Figure 5:
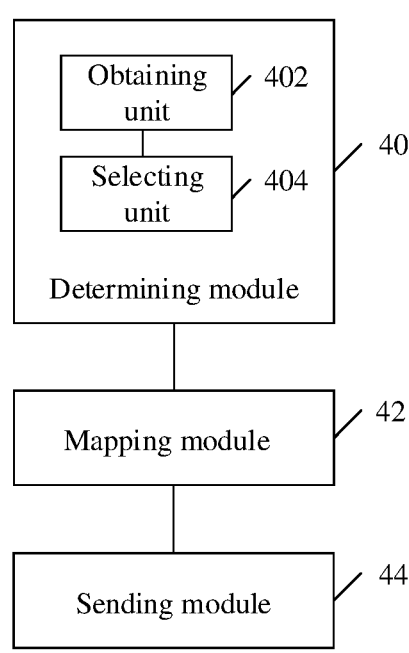
FIG. 5 is a structural block diagram of a determining module 40 of a device for sending information according to an embodiment of the disclosure.

FIG. 5 is a structural block diagram of a determining module 40 of a device for sending information according to an embodiment of the disclosure. As illustrated in FIG. 5, the determining module 40 includes: an obtaining unit 402 and a selecting unit 404. The obtaining unit 402 is configured to obtain the number of bits and information type of the information. The selecting unit 404 is connected with the obtaining unit 402 and configured to select, according to the number of bits of the information, the sequence corresponding to the reference signal to be sent from the N predefined sequences.

In the determining module 40, the N predefined sequences have the same non-zero value on a predetermined position may include that: the N predefined sequences have the same non-zero value on one symbol in the sequence; or the N predefined sequences have the same non-zero value on multiple symbols equally spaced in the sequence. Specifically, when the sequence corresponding to the reference signal is generated in a frequency domain, the N predefined sequences have the same value on the predetermined position; when the sequence corresponding to the reference signal is generated in a time domain, sequences obtained by performing discrete fourier transform on the N predefined sequences have the same value on the predetermined position.

In practical application, the functions implemented by the modules/units in the device for sending information can all be implemented by a central processing unit (CPU), a micro processor unit (MPU), a digital signal processor (DSP), a field programmable gate array (FPGA) or the like located in the device for sending information.

The following describes the information sending process in conjunction with several embodiments, which are not intended to limit the scope of protection of the embodiments of the disclosure.

First Embodiment

The main ideal of the first embodiment of the disclosure is: N predefined sequences corresponding to reference signals are set, where the N predefined sequences corresponding to the reference signals have a same non-zero value on a predetermined position, and N is an integer greater than or equal to 2; a sequence corresponding to a sent reference signal is determined, according to information (equivalent to the information to be sent on the physical uplink channel in the above embodiments) or a portion of the information; the determined sequence corresponding to the reference signal and the information are mapped to a time-frequency resource and the reference signal and the information are sent on the time-frequency resource.

Furthermore, the sequence corresponding to the reference signal has a property constant of amplitude in a frequency domain, or has a property of constant amplitude in a time domain, or has a property of constant amplitude in both the time domain and the frequency domain. In some embodiments, the sequence is a constant amplitude zero auto-correlation (CAZAC for short) sequence, or a two-phase/four-phase sequence. Here, the two-phase sequence refers to a sequence constituted by sequence elements taken from a set $\{-1, +1\}$; the four-phase sequence refers to a sequence constituted by sequence elements taken form a set $\{-1, -i, 1, +i\}$ or $\{0.7071+0.7071i, 0.7071-0.7071i, -0.7071+0.7071i, -0.7071-0.7071i\}$; and i is an imaginary unit. The following further provides some embodiments of sequences corresponding to the reference signals that meet the above features.

Specific Embodiment 1 it is assumed that the sequence corresponding to the reference signal is generated in the time domain, let sequence 1 and sequence 2 as well as sequences obtained by performing Discrete Fourier Transform (DFT for short) on sequence 1 and sequence 2 be as shown in Table 1 below:

TABLE 1

| n  | s1(n) | s2(n) | DFT(s1)          | DFT(s2)          |
|----|-------|-------|------------------|------------------|
| 0  | −1    | −1    | −4.0000          | −4.0000          |
| 1  | −1    | −1    | 1.0000 + 5.7321i | −1.0000 − 0.2679i |
| 2  | −1    | −1    | −1.0000 + 1.7321i | −1.0000 + 1.7321i |
| 3  | −1    | 1     | −2.0000 + 2.0000i | 2.0000 + 2.0000i |
| 4  | −1    | −1    | −1.0000 − 1.7321i | −1.0000 + 5.1962i |
| 5  | −1    | 1     | 1.0000 + 2.2679i | −1.0000 − 3.7321i |
| 6  | −1    | −1    | −4.0000          | −4.0000          |
| 7  | 1     | −1    | 1.0000 − 2.2679i | −1.0000 + 3.7321i |
| 8  | −1    | 1     | −1.0000 + 1.7321i | −1.0000 − 5.1962i |
| 9  | 1     | −1    | −2.0000 − 2.0000i | 2.0000 − 2.0000i |
| 10 | 1     | −1    | −1.0000 − 1.7321i | −1.0000 − 1.7321i |
| 11 | 1     | 1     | 1.0000 − 5.7321i | −1.0000 + 0.2679i |

From Table 1, it can be seen that the sequences obtained by performing Fourier transform on sequence s1 and sequence s2 are the same on the first and seventh positions (respectively corresponding to n=0 and n=6). That is, whether the sequence sent by a sending end is sequence s1 or sequence s2, the sequences received by a receiving end are all the same on the first and seventh positions in the frequency domain. By using the above characteristic, the receiving end can perform channel estimation on the two positions, and then perform interpolation by using channel estimates obtained on the two positions to obtain frequency domain estimates of received signals within a receiving bandwidth. If the channel is a flat fading channel, channel estimates of adjacent symbols can also be obtained by using the channel estimate of a symbol where the reference signal is located. In an existing LTE system, whether for a PUCCH structure or for a PUSCH structure, the channel estimate of a symbol where control information or service information is located is obtained by using the channel estimate where the reference signal is located.

Specific Embodiment 2

Assuming that the sequence corresponding to the reference signals is generated in the frequency domain, let sequence 1 and sequence 2 be as shown in Table 2:

TABLE 2

| n  | s1               | s2               |
|----|------------------|------------------|
| 0  | 0.7071 − 0.7071i | 0.7071 − 0.7071i |
| 1  | 0.7071 + 0.7071i | −0.7071 − 0.7071i |
| 2  | −0.7071 + 0.7071i | −0.7071 + 0.7071i |
| 3  | −0.7071 − 0.7071i | 0.7071 + 0.7071i |
| 4  | −0.7071 + 0.7071i | −0.7071 + 0.7071i |
| 5  | −0.7071 + 0.7071i | 0.7071 − 0.7071i |
| 6  | 0.7071 + 0.7071i | 0.7071 + 0.7071i |
| 7  | 0.7071 + 0.7071i | −0.7071 − 0.7071i |
| 8  | −0.7071 + 0.7071i | −0.7071 + 0.7071i |
| 9  | 0.7071 + 0.7071i | −0.7071 − 0.7071i |
| 10 | −0.7071 − 0.7071i | −0.7071 − 0.7071i |
| 11 | −0.7071 + 0.7071i | 0.7071 − 0.7071i |

From Table 2, it can be seen that sequence s1 and sequence s2 are the same when n=0/2/4/6/8/10. That is, whether the sequence sent by the sending end is sequence s1 or sequence s2, the sequences received by the receiving end are the same when n=0/2/4/6/8/10. By using the above characteristic, the receiving end can perform channel estimation on the positions, and then obtain the frequency domain estimates of the received signals within the receiving bandwidth by using the channel estimates obtained on these positions. If the channel is a flat fading channel, channel estimates of adjacent symbols can also be obtained by using the channel estimate of a symbol where the reference signal is located. In an existing LTE system, whether for a PUCCH structure or for a PUSCH structure, the channel estimate of a symbol where control information or service information is located is obtained by using the channel estimate where the reference signal is located.

It should be noted that the sequence s1 is one of basic sequences among computer generated-CAZAC (CG-CAZAC for short) sequences which have a length of 12 and are defined by existing LTE. The sequence s2 involves a phase rotation of sequence s1 in the frequency domain (equivalent to a cyclic shift of a time-domain sequence), that is:

$$s_2(n) = s_1(n) \times \exp\left(j\frac{2\pi kn}{N}\right), n = 0, 1, 2, \ldots, 11, N = 12;$$

where, k is a cyclic shift amount. In the above embodiments, s2 is a sequence obtained by performing frequency-domain phase rotation by k=6 on sequence s1.

It can be found from the research on a sequence having a length of 12 in LTE that the basic sequence and sequences thereof having cyclic shift amounts of 2, 4, 6, 8, and 10 have the same element values on two positions, and the two positions are n=0 and 6. The details are shown in Table 3 below.

TABLE 3

| n | s1 | s2(k = 2) | s3(k = 4) | s4(k = 6) | s5(k = 8) | s6(k = 10) |
|---|---|---|---|---|---|---|
| 0 | 0.7071 − 0.7071i | 0.7071 − 0.7071i | 0.7071 − 0.7071i | 0.7071 − 0.7071i | 0.7071 − 0.7071i | 0.7071 − 0.7071i |
| 1 | 0.7071 + 0.7071i | −0.7071 − 0.7071i | −0.9659 + 0.2588i | −0.7071 − 0.7071i | 0.2588 − 0.9659i | 0.9659 − 0.2588i |
| 2 | −0.7071 + 0.7071i | −0.7071 + 0.7071i | 0.9659 + 0.2588i | −0.7071 + 0.7071i | −0.2588 − 0.9659i | 0.9659 + 0.2588i |
| 3 | −0.7071 − 0.7071i | 0.7071 + 0.7071i | −0.7071 − 0.7071i | 0.7071 + 0.7071i | −0.7071 − 0.7071i | 0.7071 + 0.7071i |
| 4 | −0.7071 + 0.7071i | −0.7071 + 0.7071i | −0.2588 − 0.9659i | −0.7071 + 0.7071i | 0.9659 + 0.2588i | −0.2588 − 0.9659i |
| 5 | −0.7071 + 0.7071i | 0.7071 − 0.7071i | 0.9659 + 0.2588i | 0.7071 − 0.7071i | −0.2588 − 0.9659i | −0.9659 − 0.2588i |
| 6 | 0.7071 + 0.7071i | 0.7071 + 0.7071i | 0.7071 + 0.7071i | 0.7071 + 0.7071i | 0.7071 + 0.7071i | 0.7071 + 0.7071i |
| 7 | 0.7071 + 0.7071i | −0.7071 − 0.7071i | −0.9659 + 0.2588i | −0.7071 − 0.7071i | 0.2588 − 0.9659i | 0.9659 − 0.2588i |
| 8 | −0.7071 + 0.7071i | −0.7071 + 0.7071i | 0.9659 + 0.2588i | −0.7071 + 0.7071i | −0.2588 − 0.9659i | 0.9659 + 0.2588i |
| 9 | 0.7071 + 0.7071i | −0.7071 − 0.7071i | 0.7071 + 0.7071i | −0.7071 − 0.7071i | 0.7071 + 0.7071i | −0.7071 − 0.7071i |
| 10 | −0.7071 − 0.7071i | −0.7071 − 0.7071i | 0.9659 − 0.2588i | −0.7071 − 0.7071i | −0.2588 + 0.9659i | 0.9659 − 0.2588i |
| 11 | −0.7071 + 0.7071i | 0.7071 − 0.7071i | 0.9659 + 0.2588i | 0.7071 − 0.7071i | −0.2588 − 0.9659i | −0.9659 − 0.2588i |

The basic sequence and sequences thereof having cyclic shift amounts of 3, 6, and 9 have the same element values on three positions, and the three positions are n=0, 4, and 8, respectively. The details are as shown in Table 4 below.

TABLE 4

| n | s1 | s2(k = 3) | s3(k = 6) | s4(k = 9) |
|---|---|---|---|---|
| 0 | 0.7071 − 0.7071i | 0.7071 − 0.7071i | 0.7071 − 0.7071i | 0.7071 − 0.7071i |
| 1 | 0.7071 + 0.7071i | −0.7071 + 0.7071i | −0.7071 − 0.7071i | 0.7071 − 0.7071i |
| 2 | −0.7071 + 0.7071i | 0.7071 − 0.7071i | −0.7071 + 0.7071i | 0.7071 − 0.7071i |
| 3 | −0.7071 − 0.7071i | −0.7071 − 0.7071i | 0.7071 + 0.7071i | 0.7071 − 0.7071i |
| 4 | −0.7071 + 0.7071i | −0.7071 + 0.7071i | −0.7071 + 0.7071i | −0.7071 + 0.7071i |
| 5 | −0.7071 + 0.7071i | −0.7071 − 0.7071i | 0.7071 + 0.7071i | 0.7071 + 0.7071i |
| 6 | 0.7071 + 0.7071i | −0.7071 − 0.7071i | 0.7071 + 0.7071i | −0.7071 − 0.7071i |
| 7 | 0.7071 + 0.7071i | 0.7071 − 0.7071i | −0.7071 − 0.7071i | −0.7071 + 0.7071i |
| 8 | −0.7071 + 0.7071i | −0.7071 + 0.7071i | −0.7071 + 0.7071i | −0.7071 + 0.7071i |
| 9 | 0.7071 + 0.7071i | −0.7071 + 0.7071i | −0.7071 − 0.7071i | 0.7071 − 0.7071i |
| 10 | −0.7071 − 0.7071i | 0.7071 + 0.7071i | −0.7071 − 0.7071i | 0.7071 + 0.7071i |
| 11 | −0.7071 + 0.7071i | 0.7071 + 0.7071i | 0.7071 − 0.7071i | −0.7071 − 0.7071i |

The above properties of the basic sequence and cyclically shifted sequences thereof can be generalized.

A CG-CAZAC basic sequence of LTE and sequences thereof having cyclic shift amounts of k1, k2, k3, k4, . . . have the same element values on k positions, where k is the greatest common divisor of {k1, k2, k3, k4, . . . }. The k elements respectively correspond to sequence elements of n=[0:N/k:N], i.e., starting from 0 and taking values at intervals of N/k.

Table 3 and Table 4 both satisfy the above rules.

For Table 3, in the CG-CAZAC basic sequence and the sequences having cyclic shift amounts of {2, 4, 6, 8, 10}, because the greatest common divisor of {2, 4, 6, 8, 10} is 2, these sequences have the same element values on two positions, and the two elements respectively correspond to sequence elements of n=0 and 6 (6=12/2).

For Table 4, in the CG-CAZAC basic sequence and the sequences having cyclic shift amounts of {3, 6, 9}, because the greatest common divisor of {3, 6, 9} is 3, these sequences have the same element values on three positions, and the three elements respectively correspond to sequence elements of n=0, 4 (4=12/3), and 8.

The above rules can also be extended to a CG-CAZAC sequence having a length of 24.

Without loss of generality, when the N predefined sequences are constituted by a sequence and sequences obtained by performing time-domain cyclic shifts or frequency-domain phase rotations on the sequence, the N predefined sequences have, but are not limited to, the following characteristics:

When a minimum value of a relative cyclic shift amount or phase rotation amount between any two of the N predefined sequences is set to α, the N predefined sequences have a same element among the N predefined sequences at each of X positions in the frequency domain. Here, X is a number of elements in a set of values of n that satisfy an equation $$\frac{\alpha \times n}{L} = y;$$

y is an integer greater than or equal to 0; n=0, 1, 2, . . . , L−1; L is the length of the sequence; 0<α<L; and 2<N<L.

For Table 2, the relative cyclic shift amount of sequences s1 and s2 is 6, i.e., α=6, and the length of the sequences is L=12.

For n=0, 1, 2, . . . , 11, $$\frac{6 \times n}{12} = y$$

is satisfied in the following cases:

n=0, y=0
n=2, y=1
n=4, y=2
n=6, y=3
n=8, y=4
n=10, y=5.

That is, the number of elements in a set of values of n is six, and therefore, s1 and s2 have equal elements on six positions.

For Table 3, the minimum value of the relative cyclic shift amount of any two sequences among sequences s1, s2, s3, s4, s5, and s6 is 2, i.e., α=2, and the length of the sequences is L=12.

For n=0, 1, 2, ..., 11, $$\frac{2 \times n}{12} = y$$

is satisfied in the following cases:

n=0, y=0
n=6, y=1.

That is, the number of elements in a set of values of n is two, and therefore, s1, s2, s3, s4, s5, and s6 have equal elements on two positions.

For Table 4, the minimum value of the relative cyclic shift amount of any two sequences among sequences s1, s2, s3, and s4 is 3, i.e., α=3, and the length of the sequences is L=12.

For n=0, 1, 2, ..., 11, $$\frac{3 \times n}{12} = y$$

is satisfied in the following cases:

n=0, y=0
n=4, y=1
n=8, y=2.

That is, the number of elements in a set of values of n is three, and therefore, s1, s2, s3, and s4 have equal elements on three positions.

Second Embodiment

When the determined N sequences corresponding to available reference signals are obtained by using the approach as described in the first Embodiment, and when the information is uplink control information, the following cases may be existed.

(1) when the uplink control information is 1-bit HARQ-ACK and the currently sent HARQ-ACK is ACK, the sequence corresponding to the sent reference signal is sequence 1; otherwise, the sequence corresponding to the sent reference signal is sequence 2, N=2.

(2) when the uplink control information is 2-bit HARQ-ACK and the currently sent HARQ-ACK is {ACK, ACK}, the sequence corresponding to the sent reference signal is sequence 1;

(3) when the uplink control information is 2-bit HARQ-ACK and the currently sent HARQ-ACK is {ACK, NACK}, the sequence corresponding to the sent reference signal is sequence 2;

(4) when the uplink control information is 2-bit HARQ-ACK and the currently sent HARQ-ACK is {NACK, ACK}, the sequence corresponding to the sent reference signal is sequence 3;

(5) when the uplink control information is 2-bit HARQ-ACK and the currently sent HARQ-ACK is {NACK, NACK}, the sequence corresponding to the sent reference signal is sequence 4; N=4.

The value of N is preferably 2 or 4. Thus, by sequence selection of the reference signal, one or two bits information can be carried additionally or repeatedly.

Third Embodiment

Figure 6:
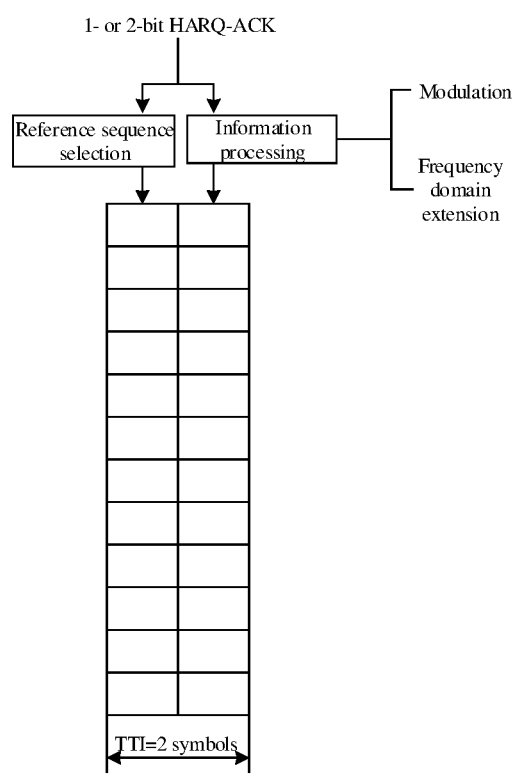
FIG. 6 is a schematic diagram of information sending according to a third embodiment of the disclosure.

FIG. 6 is a schematic diagram of information sending according to the third embodiment of the disclosure. As illustrated in FIG. 6, the sequence corresponding to the reference signal is determined according to sent HARQ-ACK information. In addition, the sent HARQ-ACK information needs to be processed, where the processing procedure includes modulation and frequency domain extension. The frequency domain extension here is the same as that of the existing LTE, and just refers to performing frequency domain extension on the modulated HARQ-ACK information by using a sequence in the frequency domain. Afterwards, the determined sequence corresponding to the reference signal is mapped to a predefined time-frequency resource, and it is assumed here that the sequence corresponding to the reference signal is mapped to a first time-domain symbol of the TTI. The processed HARQ-ACK information is mapped to the predefined time-frequency resource, and it is assumed here that the HARQ-ACK information is mapped to a second time-domain symbol of the TTI. It is also possible to map the sequence corresponding to the reference signal to a second time-domain symbol of the TTI and map the HARQ-ACK information to a first time-domain symbol of the TTI. This approach is applicable to scenarios where the short TTI contains at least 2 time-domain symbols.

Figure 7:
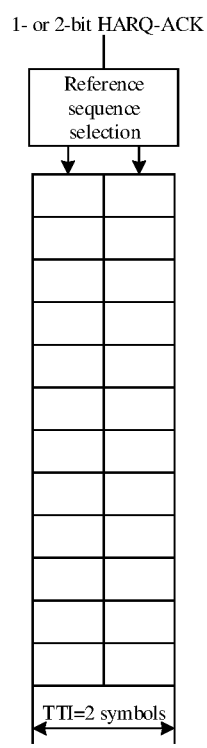
FIG. 7 is another schematic diagram of information sending according to the third embodiment of the disclosure.
Figure 8:
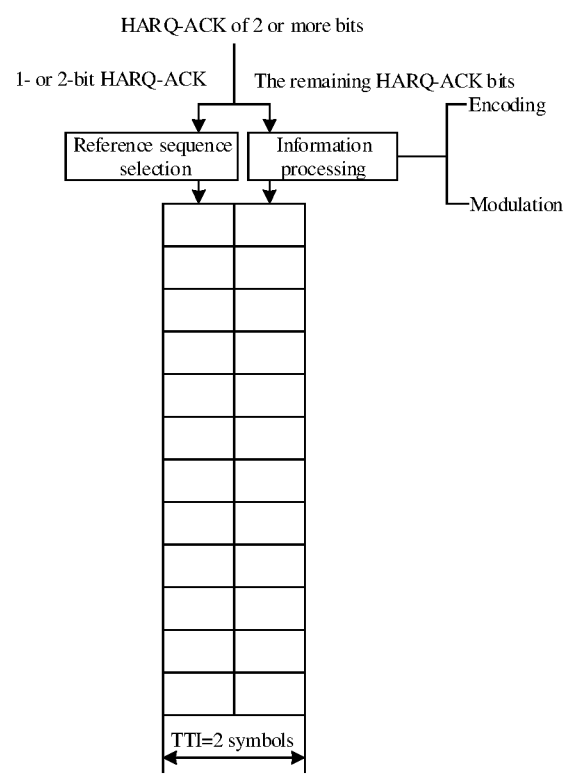
FIG. 8 is yet another schematic diagram of information sending according to the third embodiment of the disclosure.

FIG. 7 is another schematic diagram of information sending according to the third embodiment of the disclosure. In the schematic diagram, the sequence corresponding to the reference signal is determined according to the sent HARQ-ACK information. Afterwards, the determined sequence corresponding to the reference signal is mapped to the predefined time-frequency resource, and it is assumed here that the sequence corresponding to the reference signal is mapped to all the time-domain symbols of the TTI. This approach is applicable to scenarios with TTI of any length, which includes a TTI having one time-domain symbol. FIG. 8 is yet another schematic diagram of information sending according to the third embodiment of the disclosure. The flow embodied in FIG. 8 is similar to those of FIG. 6 and FIG. 7, and is not described here again.

A scenario where the HARQ-ACK is of 1 or 2 bits is given in the above embodiment. When the number of bits of the HARQ-ACK is greater than 2, information of the first bit or the first two bits of the HARQ-ACK information may be indicated in the same manner as mentioned above by using different sequences corresponding to the reference signal, and the remaining of the HARQ-ACK information will be encoded and modulated and the like, and then the modulated HARQ-ACK information will be mapped directly to the corresponding time-domain symbol. In an encoding process, the length of the encoded bit is determined according to the time-frequency resource to which the information is mapped.

It should be noted that the control information in the embodiments of the disclosure may be uplink control information, may be uplink service information, and may also be both the uplink control information and the uplink service information. The following only takes the uplink control information as an example. The execution processes are similar in other cases, and are not described here again. The technical solutions mentioned above in the embodiments of the disclosure are actually technical solutions of carrying information in a reference signal for sending. Specifically, partial information may be carried in the reference signal, or complete information may be carried in the reference signal.

In view of the above, the technical solutions in the embodiments of the disclosure achieve the following technical effects: the problem in the related art of a decrease in available resources of a physical uplink channel for sending valid data (equivalent to the control information) due to that the overheads of the reference signal increase as the number of symbols of the TTI decreases is solved, and thus, available resources for transmitting the valid data are increased.

In another embodiment, software is further provided. The software configured to execute the technical solutions described in the foregoing embodiments and implementations.

In another embodiment, a computer storage medium is further provided, which stores a computer program that is configured to execute the method for sending information according to the embodiments of the disclosure. The computer storage medium includes, but is not limited to, an optical disk, a floppy disk, a hard disk, an erasable memory, and the like.

It should be noted that the terms "first", "second", and so on in the description and claims of the disclosure and in the above accompanying drawings are intended to distinguish similar objects but do not necessarily indicate a specific order or sequence. It should be understood that the objects used in such a way may be exchanged under proper conditions to make it possible to implement the described embodiments of the disclosure in sequences except those illustrated or described here. Moreover, the terms "include", "contain", and any other variants mean to cover the non-exclusive inclusion, for example, a process, method, system, product, or device that includes a list of operations or units is not necessarily limited to those operations or units which are clearly listed, but may include other operations or units not expressly which are listed or inherent to such a process, method, system, product, or device.

It is apparent that those in the art should know that the modules or operations of the disclosure may be implemented by a universal computing device, and these modules or operations may be concentrated on a single computing device or distributed on a network consisting of multiple computing devices, and may optionally be implemented by programmable codes executable by the computing devices, so that these components or operations may be stored in a storage device for execution with the computing devices, and may be implemented, in some circumstances, by executing the shown or described operations in sequences different from those described here, or making the operations into integrated circuit modules respectively, or making multiple modules or operations therein into a single integrated circuit module. As a consequence, the disclosure is not limited to any specific hardware and software combination.

The foregoing is merely illustrative of the preferred embodiments of the disclosure and is not intended to limit the disclosure, and various changes and modifications may be made by those skilled in the art. Any modifications, equivalent substitutions, improvements, and the like within the principles of the disclosure are intended to be included within the scope of the disclosure.

INDUSTRIAL APPLICABILITY

In the technical solutions in embodiments of the disclosure, a sequence corresponding to a reference signal is selected from N sequences according to information to be sent on a physical uplink channel, so that a technical solution of sending the information according to the sequence of the reference signal is implemented. Therefore, the problem in the related art of a decrease in available resources of a physical uplink channel for sending valid data (equivalent to the information to be sent on the physical uplink channel) due to that the overheads of the reference signal increase as the number of symbols of the TTI decreases is solved, and thus, available resources for transmitting the valid data are increased.

The invention claimed is:

1. A method for sending information, comprising:
determining, according to information to be sent on a physical uplink channel, a sequence corresponding to a reference signal to be sent from N predefined sequences, wherein the N predefined sequences have a same non-zero value on a predetermined position, and N is an integer greater than or equal to 2; and
mapping the sequence corresponding to the reference signal and the information to a time-frequency resource, and sending the reference signal and the information on the time-frequency resource, wherein
when the N predefined sequences comprise sequences obtained by performing different time-domain cyclic shifts on a same sequence, or sequences obtained by performing different frequency-domain phase rotations on a same sequence, and the N predefined sequences comprises the following characteristic:
the N predefined sequences have a same element among the N predefined sequences at each of X positions in a frequency domain, wherein X is a number of elements in a set of values of n that satisfy an equation $$\frac{\alpha \times n}{L} = y,$$

α is a relative cyclic shift amount or phase rotation amount between any two of the N predefined sequences, y is an integer greater than or equal to 0, n is an integer taken from a set [0, L−1], L is the length of the predefined sequences, 0<α<L, and N is a positive integer greater than or equal to 2 and less than L.

2. The method according to claim 1, wherein the N predefined sequences have the same non-zero value on the predetermined position comprises:
when the N predefined sequences are generated in a frequency domain, the N predefined sequences have the same non-zero value on the predetermined position;
when the N predefined sequences are generated in a time domain, sequences obtained by performing discrete fourier transform on the N predefined sequences have the same non-zero value on the predetermined position.

3. The method according to claim 1, wherein determining, according to the information to be sent on the physical uplink channel, the sequence corresponding to the reference signal to be sent from N predefined sequences comprises:
selecting, according to a bit value of the information, the sequence corresponding to the reference signal to be sent from the N predefined sequences.

4. The method according to claim 1, wherein properties of the N predefined sequences comprise one of: having a property of constant amplitude in a frequency domain, having a property of constant amplitude in a time domain, or having a property of constant amplitude in both the frequency domain and the time domain.

5. The method according to claim 1, wherein the time-frequency resource comprises a time-domain resource and a frequency-domain resource; the frequency-domain resource comprises K time-domain symbols, where 1≤K≤7 and K is a positive integer; the frequency-domain resource comprises P subcarriers, where P is a positive integral multiple of one of the following numbers: 2, 3, 4, 6, or 12.

6. The method according to claim 5, wherein frequency-domain resources corresponding to the K time-domain symbols are the same, or
in the frequency-domain resource, frequency-domain resources corresponding to the K time-domain symbols are located on different subcarriers using a frequency hopping structure.

7. The method according to claim 5, wherein sending the reference signal and the information on the time-frequency resource comprises:
when the sequence corresponding to the reference signal has a property of constant amplitude on the frequency-domain resource, mapping the sequence corresponding to the reference signal to the P subcarriers, performing an inverse discrete fourier transform on the sequence corresponding to the reference signal and sending the reference signal and the information; and
when the sequence corresponding to the reference signal has a property of constant amplitude on the time-domain resource, performing discrete fourier transform of P points on the sequence corresponding to the reference signal, mapping the transformed sequence to the P subcarriers or a subset of the P subcarriers, performing an inverse discrete fourier transform on the mapped sequence and sending the reference signal and the information.

8. The method according to claim 5, wherein sending the reference signal on the time-frequency resource comprises:
sending the reference signal on at least one of the K time-domain symbols.

9. The method according to claim 8, wherein when the reference signal is sent on more than one of the K time-domain symbols, different reference signals are sent on different time-domain symbols.

10. The method according to claim 5, wherein when the time-frequency resource comprises two time-domain symbols, sending the reference signal and the information on the time-frequency resource comprises:
sending the reference signal on a first time-domain symbol, and sending the information on a second time-domain symbol; or,
sending the information on the first time-domain symbol, and sending the reference signal on the second time-domain symbol; or,
sending the reference signal on both of the two time-domain symbols, wherein the reference signal carries the information.

11. The method according to claim 10, wherein when the reference signal is sent on the two time-domain symbols, frequency-domain subcarriers occupied by the two time-domain symbols are different.

12. The method according to claim 1, wherein the information comprises at least one of uplink control information or uplink service information.

13. The method according to claim 1, wherein the predetermined position comprises: one symbol in the sequence, or a plurality of symbols equally spaced in the sequence.

14. A device for sending information, comprising a processor and a memory storing computer-readable operation instructions, wherein when the computer-readable operation instructions in the memory are run, the processor is configured to:
determine, according to information to be sent on a physical uplink channel, a sequence corresponding to a reference signal to be sent from N predefined sequences, wherein the N predefined sequences have a same non-zero value on a predetermined position, and N is an integer greater than or equal to 2;
map the sequence corresponding to the reference signal and the information to a time-frequency resource; and
send the reference signal and the information on the time-frequency resource, wherein
when the N predefined sequences comprise sequences obtained by performing different time-domain cyclic shifts on a same sequence, or sequences obtained by performing different frequency-domain phase rotations on a same sequence, and the N predefined sequences comprises the following characteristic:
the N predefined sequences have a same element among the N predefined sequences at each of X positions in a frequency domain, wherein X is a number of elements in a set of values of n that satisfy an equation $$\frac{\alpha \times n}{L} = y,$$

α is a relative cyclic shift amount or phase rotation amount between any two of the N predefined sequences, y is an integer greater than or equal to 0, n is an integer taken from a set [0, L−1], L is the length of the predefined sequences, 0<α<L, and N is a positive integer greater than or equal to 2 and less than L.

15. The device according to claim 14, wherein the processor is further configured to:
obtain a number of bits of the information and a type of the information; and
select, according to the number of bits of the information and the type of the information, the sequence corresponding to the reference signal to be sent from the N predefined sequences.

16. A non-transitory computer storage medium, in which computer executable instructions are stored, wherein the computer executable instructions are configured to execute the method for sending information, and the method comprises:
determining, according to information to be sent on a physical uplink channel, a sequence corresponding to a reference signal to be sent from N predefined sequences, wherein the N predefined sequences have a same non-zero value on a predetermined position, and N is an integer greater than or equal to 2; and
mapping the sequence corresponding to the reference signal and the information to a time-frequency resource, and sending the reference signal and the information on the time-frequency resource, wherein
when the N predefined sequences comprise sequences obtained by performing different time-domain cyclic shifts on a same sequence, or sequences obtained by performing different frequency-domain phase rotations on a same sequence, and the N predefined sequences comprises the following characteristic:
the N predefined sequences have a same element among the N predefined sequences at each of X positions in a frequency domain, wherein X is a number of elements in a set of values of n that satisfy an equation $$\frac{\alpha \times n}{L} = y,$$

α is a relative cyclic shift amount or phase rotation amount between any two of the N predefined sequences, y is an integer greater than or equal to 0, n is an integer taken from a set [0, L−1], L is the length of the predefined sequences, 0<α<L, and N is a positive integer greater than or equal to 2 and less than L.

17. The non-transitory computer storage medium according to claim 16, wherein the N predefined sequences have the same non-zero value on the predetermined position comprises:
when the N predefined sequences are generated in a frequency domain, the N predefined sequences have the same non-zero value on the predetermined position;
when the N predefined sequences are generated in a time domain, sequences obtained by performing discrete fourier transform on the N predefined sequences have the same non-zero value on the predetermined position.

18. The non-transitory computer storage medium according to claim 16, wherein determining, according to the information to be sent on the physical uplink channel, the sequence corresponding to the reference signal to be sent from N predefined sequences comprises:
selecting, according to a bit value of the information, the sequence corresponding to the reference signal to be sent from the N predefined sequences.

19. The non-transitory computer storage medium according to claim 16, wherein properties of the N predefined sequences comprise one of: having a property of constant amplitude in a frequency domain, having a property of constant amplitude in a time domain, or having a property of constant amplitude in both the frequency domain and the time domain.

* * * * *